United States Patent [19]
Hauffe et al.

[11] 3,921,662
[45] Nov. 25, 1975

[54] PLASTIC PIPES AND/OR FITTINGS WITH EXCESSIVE FLOW SAFETY VALVES

[75] Inventors: William L. Hauffe, Warrensburg; Narayan C. Saha, Decatur, both of Ill.

[73] Assignee: Mueller Co., Decatur, Ill.

[22] Filed: Jan. 2, 1974

[21] Appl. No.: 429,852

[52] U.S. Cl. ............... 137/517; 137/515; 251/65
[51] Int. Cl.² ..................................... F16K 15/04
[58] Field of Search .............. 137/515, 515.3, 515.5, 137/515.7, 517, 528, 454.2; 251/65, 148, 151, 152, 366

[56] References Cited
UNITED STATES PATENTS

| | | | |
|---|---|---|---|
| 2,296,135 | 9/1942 | Batson et al. ................... | 137/515 X |
| 2,569,316 | 9/1951 | Jerman ............................. | 137/517 |
| 3,159,167 | 12/1964 | Mueller et al. ................. | 137/517 X |
| 3,211,173 | 10/1965 | Mueller et al. ................. | 137/517 X |
| 3,229,704 | 1/1966 | Leopold, Jr. et al. ........... | 251/65 X |
| 3,229,711 | 1/1966 | Leopold, Jr. et al. ........... | 137/517 X |
| 3,272,033 | 9/1966 | Leopold, Jr. et al. ........... | 137/318 X |
| 3,272,211 | 9/1966 | Leopold, Jr. et al. ........... | 137/318 X |
| 3,322,145 | 5/1967 | Prosser ............................. | 137/517 |
| 3,473,609 | 10/1969 | Allen ................................. | 137/515.5 X |
| 3,687,157 | 8/1972 | Whitmer ........................... | 137/515 X |

*Primary Examiner*—Alan Cohan
*Assistant Examiner*—Gerald A. Michalsky
*Attorney, Agent, or Firm*—Cushman, Darby & Cushman

[57] ABSTRACT

An excessive flow safety valve for plastic pipes or fittings is disclosed wherein the valve includes a hollow tubular body formed of a non-magnetic material and having an inlet and an outlet portion. A permanent magnet is fixedly positioned proximate the inlet portion and normally retains a steel ball spaced from the outlet portion. The outlet portion of the tubular body includes a shoulder against which the steel ball seats when the differential in pressure across the valve increases above a predetermined limit. Positioned in a groove about the outside circumference of the valve is a resilient sealing member, such as, an O-ring. The O-ring not only provides a sealing means within the pipe or fitting but also is utilized to initially position the valve in the pipe or fitting before the pipe or fitting is connected in the fluid distribution system.

14 Claims, 3 Drawing Figures

PLASTIC PIPES AND/OR FITTINGS WITH EXCESSIVE FLOW SAFETY VALVES

This invention relates to a new and improved excessive flow safety valve.

In fluid distribution systems, such as those for distributing gas or water, service tees are utilized to connect a street main with a service line to supply the gas or water to a dwelling. On occasion the service line connecting the street main via the service tee to the dwelling is ruptured by excavating operations. In addition, situations occasionally occur in a dwelling itself which result in an undesirable excessive escape of fluid. Such a rupture or rapid escape of fluid, particularly in the case of natural gas, can create a hazardous situation both in the dwelling and in the region surrounding the rupture when the rupture occurs externally of the dwelling. To solve this problem, Jerman, as disclosed in U.S. Pat. No. 2,569,316, provided a differential safety valve which included a cylindrical body having a magnet positioned in the center thereof. A ferromagnetic ball was also positioned within the cylinder and under normal conditions was attracted to the permanent magnet. When the service line was ruptured or an excessive flow of fluid occurred, the pressure differential created across the safety valve resulted in the ball being forced away from the permanent magnet and against a seat formed at the outlet end of the valve body. Thus, with the ball seated against the outlet end of the valve, no fluid could pass therethrough, thereby shutting off further flow of fluid to the dwelling. The Jerman pressure differential valve, however, has a number of drawbacks. First, since it is threaded into the fitting, the outside diameter of the threads must closely mate with the inside diameter of the threads of the fittings in order to provide a seal so that fluid cannot escape from the fitting when the ball is seated against the outlet end of the valve. In addition, since the valve is threaded into the fitting, a special fitting is required, thereby adding to the expense of having a pressure differential safety valve in the system.

Other attempts have been made to provide a simple and efficient yet foolproof safety valve as disclosed in Mueller et al. U.S. Pat. Nos. 3,159,167 and 3,211,173. These references disclose a service tee utilizing an excessive flow safety valve of similar design to that of the Jerman development. However, as disclosed in U.S. Pat. Nos. 3,272,211 and 3,272,033 to Leopold et al., elaborate tools are required for positioning these safety valves within the service tee. In addition, these safety valves suffer from the same drawbacks as the Jerman safety valve since tight tolerances are required as a result of the threaded connection of the safety valve to the service tee.

With the advent of the use of plastic fittings and pipes, a new problem has occurred since plastic gas pipes have both outside diameter and wall thickness dimensional controls. Thus the inside diameter variation can be the sum of both the outside diameter and wall thickness tolerances. For example, the inside diameter variation of ¾ inch SDR 11 iron pipe size plastic pipes can be as great as 0.048 inches. Thus, if the threaded connection of a safety valve is designed to fit a ¾ inch plastic gas pipe, the fit could be quite loose in some pipes and very tight in others. Accordingly, threaded connections of excessive flow safety valves of the type contemplated by the present invention have been less than adequate when utilized in plastic pipes or fittings.

It therefore is an object of this invention to provide an improved excessive flow safety valve for plastic pipes and/or fittings.

SHORT STATEMENT OF THE INVENTION

Accordingly, this invention relates to an excessive flow safety valve for plastic pipes or fittings. The safety valve includes a hollow tubular shaped body of non-magnetic material which has an inlet portion and an outlet portion. A permanent magnet is fixedly positioned proximate the inlet portion and a seat is formed in the outlet portion. A ball of ferromagnetic material, such as steel, is positioned within the tubular body so that the ball is normally attracted to and is in contact with the permanent magnet. Under normal conditions of fluid flow the fluid passes around the permanent magnet, through the tubular body and out of the valve through the outlet portion thereof. However, when the pressure differential across the valve increases beyond a predetermined point, the steel ball is forced away from the permanent magnet and is seated against the outlet portion of the valve, thereby shutting off further fluid flow to the service line.

Positioned about the external periphery of the valve is a groove having a resilient sealing member, such as an O-ring, positioned therein. The O-ring performs a number of functions. First, it provides a variable sealing means for sealing the inlet end from the outlet end of the valve within the dimensional tolerances of the inside diameter of the pipe or fitting utilized. In addition, when positioning the valve in the fitting or pipe, the resilient sealing means provides a friction stop for maintaining the valve in position before the pipe or fitting is joined together with another pipe or fitting. In addition, a number of other advantages are obtained with the resilient sealing means not heretofore known in the prior art, as will be more fully explained in connection with the detailed description of the preferred embodiment.

BRIEF DESCRIPTION OF THE DRAWINGS

Other objects, features and advantages of the present invention will become more fully understood from the following detailed description, appended claims and accompanying drawings, in which:

DETAILED DESCRIPTION OF THE PREFERRED EMBODIMENT

Figure 1:
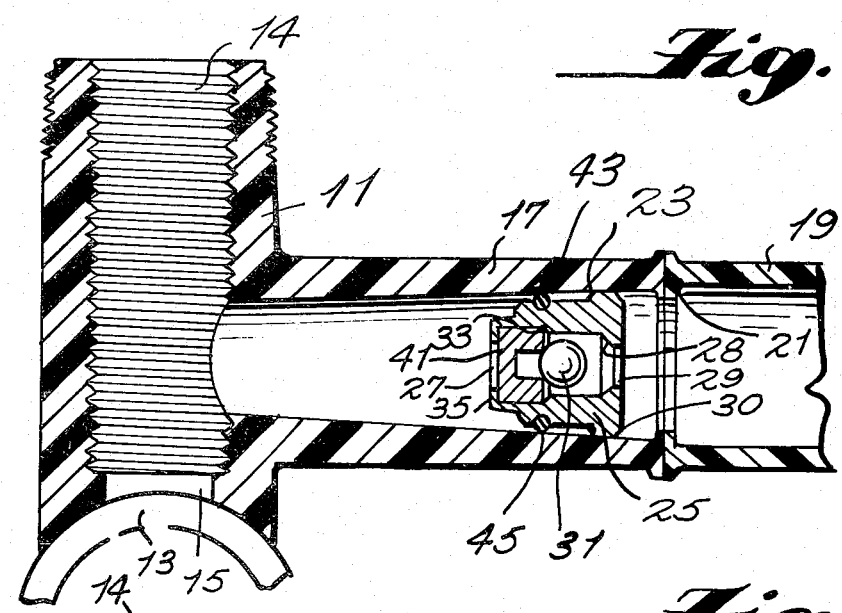
FIG. 1 is a section view of the safety valve of the present invention shown positioned in a service tee after the service line has been joined to the tee but before fluid initially flows therethrough.

Refer now to FIG. 1 which is a section view of the excessive flow safety valve of the present invention shown positioned in a service tee. The service tee includes a tee body 11 which is suitably connected to a street main 13 by any suitable technique known in the art such as, for example, a butt fusion process. The service tee has an inlet opening 15 for permitting the ingress of fluid from the street main with respect thereto. At the outlet 14 of the tee body is a threaded opening into which a plug (not shown) is sometimes positioned. A cap (also not shown) is threaded about the outside periphery of the tee body at the outlet end 14 thereof. The service tee also includes a lateral outlet portion 17 which has a variable inside diameter which increases as the aperture of the lateral outlet portion of the fitting is approached.

The excessive flow safety valve 23 is shown positioned upon initial assembly in the lateral outlet portion of the service tee away from the aperture thereof. This positioning is important for satisfactory joining of the service line 19 to the service tee by means of the butt fusion process since the valve body could act as a heat sink. The butt fusion process causes an annular bead 21 to form about the inside periphery of the junction of the service line 19 and the outlet portion 17 of the service tee. Thus, when fluid under pressure is introduced into the service tee and is forced against the safety valve 23, the safety valve is forced against the annular bead 21 to thereby establish the permanent position of the valve in the service tee.

The safety valve 23 includes a hollow tubular shaped body portion 25 having an enlarged outlet end portion 30 for bearing against the annular bead 21 of the junction of the service line and the service tee. The valve body may be formed of any suitable non-magnetic material such as brass, aluminum, suitable types of stainless steel, or rigid plastics such as acetal, PVC, or nylon. The body of the valve also includes an inlet opening 27 which is substantially circular in shape and an outlet opening 29 which is of a reduced diameter. The outlet portion of the valve includes a circumferential shoulder portion 28 which defines a seat against which a ferromagnetic ball 31 is seated when the pressure differential across the valve increases beyond a predetermined point. A permanent magnet 41 is positioned proximate the inlet end of the valve and is prevented from moving downstream because of a circumferential shoulder 33 in the tubular body 25 of the safety valve. In addition, the magnet is prevented from moving upstream because of an inwardly directed flange portion 35 which extends inwardly toward the longitudinal axis of the valve. Thus, the permanent magnet is permanently positioned with respect to the body of the valve. The permanent magnet is of a U-shape configuration and has a rectangular configuration when viewed in the direction of the longitudinal axis of the safety valve. Thus, fluid can pass from the street main 13 into the service tee 11, through the inlet opening 27 of the safety valve and around the side surfaces of the permanent magnet 41. The fluid then flows past the ball 31 and out the outlet aperture 29 into the service line 19.

Should a rupture occur in the service line or excessive fluid flow into the dwelling, a pressure differential will build up across the safety valve 23 which forces the ball 31 away from the magnet 41 and against the seat defined by the shoulder 28 at the outlet portion of the valve. Hence, fluid flow through the safety valve is cut off. The ball remains in position against seat 28 until the pressure in the service line is increased to a point where the ball can return to the permanent magnet under the magnetic force provided by the magnet.

Around the outside periphery of the valve is an annular groove 43 having a resilient sealing means 45 positioned therein. Any suitable sealing means may be utilized but in the preferred embodiment a conventional O-ring is positioned in the groove. The O-ring performs a number of functions. First, it acts as a seal when the valve is in position so that fluid from the street main cannot escape around the outside periphery of the safety valve. A tight seal is of particular importance when the ball 31 is seated against the shoulder 28 of the outlet portion of the valve since the pressure differential across the valve is greatest during this time, and since closing of the valve means a malfunction has occurred in the downstream distribution system, it is important that no more than a controlled amount of fluid escapes from the valve to the service line. The resilient sealing means provides an unique advance in the technology because the O-ring compensates for the wide inside diameter tolerance range found in plastic gas pipes and fittings. For example, the inside diameter variation of ¾ inch gas pipes can be as great as 0.048 inches depending upon the manufacturer. Therefore, if a valve body was designed so that it made a press fit in a pipe having the largest possible inside diameter for a given nominal pipe size, then it would be very difficult to fit the valve body into a pipe having the smallest possible inside diameter in the tolerance range. Thus, in effect, the O-ring provides a resilient press fit in the plastic pipe despite the fact that the pipe in which the valve is to be positioned has a relatively large inside diameter variation allowed by the appropriate standard on gas pressure pipes and fittings.

In addition, the resilient sealing means provides for easy installation of the excessive flow safety valve since the resilient sealing means initially holds the valve in the position shown in FIG. 1 while the service tee is being joined to the service line 19. Because of the friction fit of the O-ring inside the service tee, the service tee can be moved about without the valve falling out of place. After the tee 11 and line 19 have been joined by, for example, a butt fusion process, the valve will become permanently seated against the annular bead 21 by means of the fluid pressing against the inlet end of the valve body.

Figure 2:
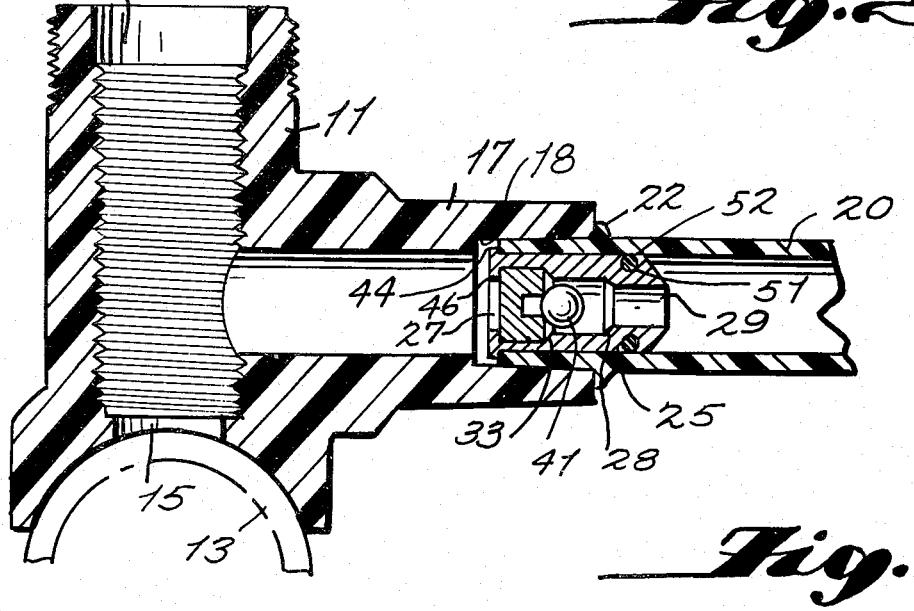
FIG. 2 is a section view of the safety valve of the present invention shown positioned in a service line.

Refer now to FIG. 2 wherein there is disclosed the safety valve of the present invention positioned in the service line rather than in the service tee. The service tee is of substantially the same design as that illustrated in FIG. 1 except that the lateral outlet portion thereof has a socket 18 defined by an enlarged pipe receiving inside diameter at the end thereof. The service line 20 has an outside diameter which is slightly larger than the inside diameter of the service tee. Thus, when the end of the line 20 is inserted into the end of the service tee after each has been appropriately heated, a thin film of plastic is wiped off the outside of the pipe as the pipe is pushed into the fitting socket. An annular bead 22 then forms about the outside diameter of the pipe 20. The fusion process utilized is well known in the art and is known as the socket fusion process.

The safety valve includes a tubular body 25 having an inlet portion 27 and an outlet portion 29. The inlet portion includes a double flange which extends outwardly away from the external periphery of the valve body and inwardly toward the longitudinal axis of the valve body, as illustrated in the figure. The externally extending portion of the flange 44 seats against the end of the pipe 20 to thereby prevent the valve from moving downstream into the pipe 20. The inwardly directed flange 46 prevents the permanent magnet 41 from moving upstream with respect to the valve body. A shoulder portion 33 which extends about the inside periphery of the tubular body 25 prevents the magnet from moving downstream with respect to the valve body and accordingly the permanent magnet is fixedly positioned with respect to the valve. A second circumferential shoulder 28 is formed in the tubular body which shoulder forms a seat against which the ferromagnetic ball 31 is positioned when the pressure differential across the safety valve increases past a predetermined level. Thus, in operation, fluid flows from a street main 13 through the inlet opening 15 of the service tee 11 and then outwardly through the lateral outlet portion 17 of the service tee. The fluid passes around the side surfaces of the magnet 41 and past the ball 31, and then exits through the outlet opening 29 into the service line 20. When the pressure differential increases beyond a predetermined point, the steel ball 31 is forced away from the magnet 41 and is seated against the shoulder portion 28 of the safety valve. Thus, fluid flow through the safety valve is prevented or limited to a controlled amount.

A groove 51 is formed around the outside periphery of the valve proximate the outlet portion thereof. A resilient sealing means 52 such as, for example, an O-ring is positioned in the groove to thereby prevent fluid from flowing over the external periphery of the valve when the ball 31 is seated against the shoulder 28. In addition, the O-ring allows the outside diameter of the valve to be smaller than the smallest permissible inside diameter of the pipe 20 to thereby prevent the pipe from becoming overstressed when the pipe 20 is compressed onto the safety valve during the fusion process. Thus, the O-ring, by allowing a resilient press fit, prevents overstress of the pipe joint after the socket fusion joint has been made since, as is well known, the socket fusion process has a tendency to reduce the inside diameter of the part of the pipe that is inserted into the socket.

The O-ring retains the valve body in the pipe keeping it from falling out while the pipe is being handled prior to the fusion bonding process and in addition, centers the valve in the pipe and helps round the pipe in the area that goes into the socket of the tee if the pipe should happen to be partially flattened. Finally, since the valve is a separate unit and is secured to the pipe by mechanical means as opposed to a chemical means, compatibility between the plastic pipe material being used and the material utilized in the valve body is not required.

Figure 3:
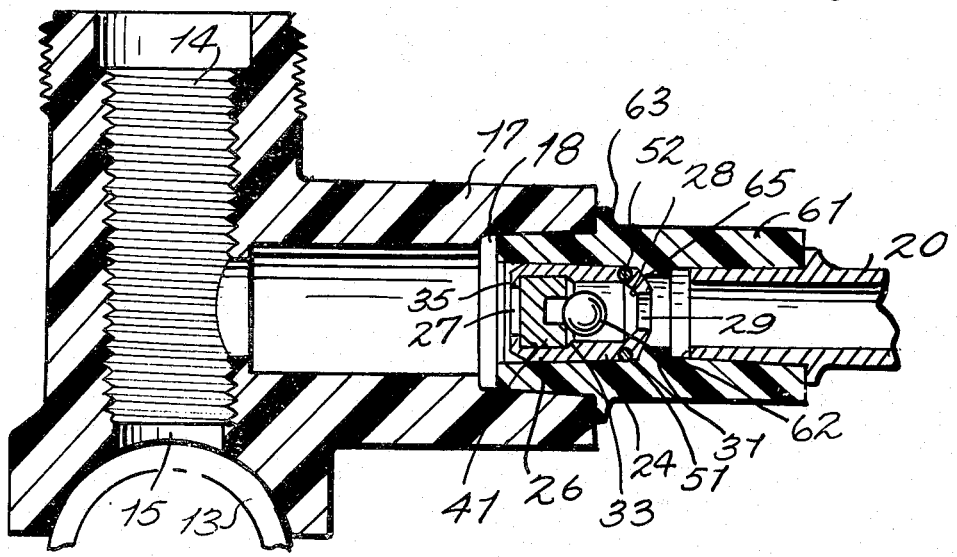
FIG. 3 is a section view showing the excessive flow safety valve of the present invention positioned in a fitting which joins the service line to a service tee.

Refer now to FIG. 3 which illustrates the safety valve of the present invention shown positioned in a fitting which interconnects the service tee with a service line. The service tee is substantially similar to that illustrated in FIGS. 1 and 2 and includes an inlet opening 15 and an outlet portion 17 for communicating a fluid from a street main 13 to a service line 20. It is noted, however, in this figure that the service line has a smaller outside diameter than the inside diameter of the socket portion 18 of the service tee. Accordingly, a fitting 61, formed of a plastic material, is required. The fitting 61 is joined to the service tee by means of a socket fusion process. Positioned in the fitting 61 is a safety valve 24 which includes a hollow tubular body 26 having an inlet portion 27 and an outlet portion 29. An inwardly directed flange 35 is formed about the inside opening of the valve to retain a permanent magnet 41 in position. In addition, an inwardly directed shoulder portion 33 is formed inside the tubular body about the inside periphery thereof to prevent the permanent magnet from moving downstream with respect to the valve body. At the outlet end of the valve body is formed a circumferential shoulder 28 against which a steel ball 31 is seated when the pressure differential across the valve exceeds a predetermined level. The fitting 61 includes a circumferential shoulder 65 about the inside periphery thereof against which the valve 24 is seated and which prevents the valve from moving downstream under the pressure of the fluid passing through the system. An annular groove 51 is formed in the outside periphery of the valve body proximate the outlet portion thereof and a resilient sealing means is positioned in the groove. The resilient sealing means 52 prevents the flow of fluid along the outside periphery of the valve means when the ball 31 is seated against the shoulder 28. In addition, as was discussed with regard to FIGS. 1 and 2, the O-ring compensates for the relatively wide tolerance range of the plastic pipe fitting 61 and initially retains the safety valve in position before the safety valve and fitting 61 are joined to the service tee 11.

Downstream of the valve 24, at the outlet end of the fitting 61, is positioned a plastic pipe 20. The pipe 20 is secured to the service tee by a socket fusion process well known in the art. It should be understood that rather than have a shoulder 65 formed in the fitting, the end surface 62 of pipe 20 could be utilized to prevent the valve from moving downstream.

By this invention a simplified excessive flow safety valve is provided which is capable of operating in plastic pipes or fittings having a wide tolerance range for the inside diameter. In addition, the excessive flow safety valve of the present invention permits easy assembly in the pipe or fitting, thereby obviating the necessity of complex tools and valve insertion procedures if the valve is installed in such a way that no mechanical or chemical joining between the valve and either the pipe or fitting is necessary. Thus, the valve is not an integral part of the pipe system and does not effect the system strength or create any compatability problems therewith.

While the present invention has been disclosed with respect to a preferred embodiment, it should be understood there are other obvious modifications and variants of applicants' invention which come within the spirit and scope of the invention as defined by the appended claims.

What is claimed is:

1. A method of positioning an excessive flow safety valve in a fluid conducting system for preventing the flow of fluid in a plastic fluid flow conduit when the differential in pressure across said valve exceeds a preset level, wherein the valve includes a threadless body having a fluid flow passage therethrough, said passage terminating in a valve element seating portion, a ferromagnetic valve element, magnetic means for normally maintaining said valve element spaced from said seating portion of said body, wherein fluid normally flows around said valve element and through said passageway from one end of said safety valve to the other end thereof and wherein when the pressure differential across said valve exceeds a predetermined level, said valve element is forced against said seating portion of said valve body to thereby prevent the flow of fluid through said safety valve, resilient sealing means extending about the outside periphery of said valve body and means for fixing said sealing means to said valve body, the method of positioning said valve element in said conduit comprising the steps of:

positioning said valve element inside said conduit away from the end thereof, temporarily retaining said valve in said conduit away from the open end thereof, joining said conduit to another fluid flow conduit by fusing said conduits together, forming an annular bead about the inside diameter at the junction of said conduits, and forcing said valve against said bead by fluid pressure directed against the upstream end of said excessive flow safety valve.

2. A method of positioning an excessive flow safety valve in a fluid conducting system for preventing the flow of fluid through a plastic conduit when the differential in pressure across said valve exceeds a preset level, said valve comprising a threadless body having a fluid flow passage therethrough, said passage terminating in a valve element seating portion, a ferromagnetic valve element, magnetic means for normally maintaining said valve element spaced from said seating portion of said body, wherein fluid normally flows around said valve element and through said passageway from one end of said safety valve to the other end thereof and wherein when the pressure differential across said valve exceeds a predetermined level said valve element is forced against said seating portion of said valve body to thereby prevent the flow of fluid through said safety valve, resilient sealing means extending about the outside periphery of said valve body and means for fixing said sealing means with respect to said valve body, said method of positioning said valve in said fluid conducting system comprising the steps of:

inserting said valve in a fluid flow conduit, retaining said valve in position temporarily by means of the friction fit of said resilient sealing means against the inside diameter of said conduit, and joining said plastic conduit to a second plastic fluid conducting means by fusing said conduit and said fluid conducting means together, said valve being secured in position by the fluid pressure acting against the end of said valve element.

3. A method of positioning an excessive flow safety valve in a fluid conducting system for preventing the flow of fluid through a plastic fluid conducting system when the differential in pressure across said valve exceeds a preset level, said valve comprising a threadless body having a fluid flow passage therethrough said passage terminating in a valve element seating portion, a ferromagnetic valve element, magnetic means for normally maintaining said valve element spaced from said seating portion of said body, wherein fluid normally flows around said valve element through said passageway from one end of said safety valve to the other end thereof and wherein when the pressure differential across said valve exceeds a predetermined level said valve element is forced against said seating portion of said valve body to thereby prevent the flow of fluid through said safety valve, resilient sealing means extending about the outside periphery of said valve body and means fixing said sealing means with respect to said valve body, the method of positioning said valve in said fluid conducting system comprising the steps of:

positioning said valve element in a fitting, temporarily retaining said valve element in said fitting by means of the friction fit of said resilient sealing means against the inside diameter of said fitting, positioning said fitting in said fluid flow system, securing said fitting in said fluid conducting system by a fusion process, and fixing the position of said valve with respect to said fitting by the force of the fluid conducted by said system acting against the upstream end of said excessive flow safety valve.

4. In a fluid conducting system including first and second plastic fluid conducting means, said fluid conducting means being joined by a heat fusion process to form at least one fluid passage therethrough, an excessive flow safety valve for preventing the flow of fluid therethrough when the differential in pressure across said valve exceeds a preset level, said valve comprising a threadless body having a fluid flow passage therethrough, said passage terminating in a valve element seating portion, a ferromagnetic valve element, magnetic means for normally maintaining said valve element spaced from said seating portion of said body, wherein fluid normally flows around said valve element and through said passageway from one end of said safety valve to the other end thereof and wherein when the pressure differential across said valve exceeds a predetermined level, said valve element is forced against said seating portion of said valve body to thereby prevent the flow of fluid through said safety valve, resilient means for maintaining said safety valve in one of said fluid conducting means prior to joining said first and second fluid conducting means, said resilient means extending about the outside periphery of said valve body and engaging the inside periphery of said one fluid conducting means in which said safety valve is positioned wherein said resilient means prevents the flow of fluid along the outside periphery of said valve from one end to the other end thereof, and means for permanently retaining said safety valve in a preselected position in said fluid conducting system after said first and second fluid conducting means are joined, said retaining means including at least one surface bearing against one of said fluid conducting means to impart a force along the longitudinal direction thereof.

5. The excessive flow safety valve of claim 4 wherein said means for permanently retaining said safety valve in position is an annular bead which extends inwardly from the inside diameter of said fluid conducting means, said annular bead being formed by joining two plastic fluid conducting means by a butt fusion process.

6. The excessive flow safety valve of claim 5 wherein said means for temporarily retaining said safety valve in said fluid conducting means comprises an O-ring, said O-ring being positioned in a groove extending about the outside periphery of said valve body.

7. The excessive flow safety valve of claim 4 wherein said magnetic means for normally maintaining said valve element spaced from said seating portion of said body comprises a permanent magnet and said valve body further comprising means for fixedly securing said permanent magnet with respect to said valve body.

8. The excessive flow safety valve of claim 7 wherein said means for fixedly positioning said permanent magnet with respect to said safety valve comprises a circumferential shoulder extending inwardly toward the longitudinal axis of said valve body and a flange portion at the inlet end of said valve body, said flange portion preventing said permanent magnet from moving upstream with respect to said valve body and said shoulder preventing said permanent magnet from moving downstream with respect to said valve body.

9. The excessive flow safety valve of claim 8 wherein said valve element is a steel ball.

10. The excessive flow safety valve of claim 4 wherein said means for permanently retaining said safety valve in position includes a flange portion of said valve body which extends outwardly from the external periphery of said valve body, said circumferential flange portion engaging the end of a conduit in which said excessive flow safety valve is positioned.

11. The excessivve flow safety valve of claim 4 wherein said means for permanently retaining said safety valve in position includes a shoulder portion of said fluid conducting means in which said safety valve is positioned, said shoulder bearing against the outlet end portion of said valve body, thereby preventing said valve from moving downstream.

12. The excessive flow safety valve of claim 4 wherein said means for temporarily retaining said safety valve in said one fluid conducting means comprises an O-ring seal, said O-ring seal being positioned in a groove extending about the outside periphery of said valve body.

13. The excessive flow safety valve of claim 12 wherein said means for permanently retaining said safety valve in position includes a flange portion of said valve body which extends outwardly from the external periphery of said valve body, said circumferential flange engaging the end of one of said fluid conducting means and being forced thereagainst in the longitudinal direction by the pressure differential across said safety valve.

14. A method of positioning an excessive flow safety valve in a fluid conducting system which includes first and second plastic fluid conducting means, said fluid conducting means being joinable to form at least one fluid passage therethrough by fusion and wherein said safety valve comprises a threadless body having a fluid flow passage therethrough, said passage terminating in a valve element seating portion, a ferromagnetic valve element, magnetic means for normally maintaining said valve elements spaced from said seating portion of said body, wherein fluid normally flows around said valve element and through said passageway from one end of said safety valve to the other end thereof and wherein when the pressure differential across said valve exceeds a predetermined level said valve element is forced against said seating portion of said valve body to thereby prevent the flow of fluid through said safety valve, resilient sealing means extending about the outside periphery of said body, and means for fixing said sealing means with respect to said valve body, the method of positioning said valve in said fluid flow system comprising the steps of:

inserting said valve in one of said plastic fluid conducting means, retaining said valve in position temporarily by means of the friction fit of said resilient sealing means against the inside diameter of said conduit, joining one of said plastic fluid conduction means to the other plastic fluid conduction means by fusing said conducting means together, by joining the conducting means together said valve is secured in a predetermined position, said fluid pressure differential across said valve element acting against the end of said valve element to maintain said valve in said predetermined position.

* * * * *